(12) United States Patent
Delsman et al.

(10) Patent No.: US 12,065,522 B2
(45) Date of Patent: *Aug. 20, 2024

(54) PROCESS FOR MAKING PROPYLENE-BASED TERPOLYMER

(71) Applicant: SABIC GLOBAL TECHNOLOGIES B.V., Bergen Op Zoom (NL)

(72) Inventors: Erik Delsman, Geleen (NL); Petrus Johannes Hubertus Bronsaer, Geleen (NL); Henrica Norberta Alberta Maria Steenbakkers-Menting, Geleen (NL); Gopala Krishna Surisetty, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 756 days.

This patent is subject to a terminal disclaimer.

(21) Appl. No.: 17/262,075

(22) PCT Filed: Jul. 25, 2019

(86) PCT No.: PCT/EP2019/070047
§ 371 (c)(1),
(2) Date: Jan. 21, 2021

(87) PCT Pub. No.: WO2020/021012
PCT Pub. Date: Jan. 30, 2020

(65) Prior Publication Data
US 2021/0292449 A1    Sep. 23, 2021

(30) Foreign Application Priority Data
Jul. 27, 2018    (EP) .................................... 18186002

(51) Int. Cl.
*C08F 210/06* (2006.01)
*C08F 2/01* (2006.01)
(Continued)

(52) U.S. Cl.
CPC .............. *C08F 210/06* (2013.01); *C08F 2/01* (2013.01); *C08F 4/646* (2013.01); *C08F 4/654* (2013.01);
(Continued)

(58) Field of Classification Search
CPC .......... C08F 2/01; C08F 4/654; C08F 210/06; C08F 210/16
(Continued)

(56) References Cited

U.S. PATENT DOCUMENTS

| | | |
|---|---|---|
| 4,129,701 A | 12/1978 | Jezl et al. |
| 4,579,836 A | 4/1986 | Azoumanidis et al. |

(Continued)

FOREIGN PATENT DOCUMENTS

| | | |
|---|---|---|
| EP | 2743073 A1 | 6/2014 |
| EP | 3064548 A1 | 9/2016 |

(Continued)

OTHER PUBLICATIONS

International Serach Report for International Application No. PCT/EP2019/070047, International Filing Date Jul. 25, 2019, Date of Mailing Oct. 1, 2019, 6 pages.

(Continued)

*Primary Examiner* — Fred M Teskin
(74) *Attorney, Agent, or Firm* — CANTOR COLBURN LLP

(57) ABSTRACT

The invention relates to a process for production of terpolymers, in particular for the polymerization of propylene, and two other distinct monomers chosen from a group comprising ethylene and a C4-C12 α-olefin in a horizontal stirred reactor comprising an agitated bed and several reaction zones for forming polymer particles.

10 Claims, 12 Drawing Sheets

(51) Int. Cl.
    *C08F 4/646*     (2006.01)
    *C08F 4/654*     (2006.01)
    *C08F 210/02*     (2006.01)
    *C08F 210/08*     (2006.01)
    *C08F 210/14*     (2006.01)
    *C08L 23/16*     (2006.01)
    *B01J 19/00*     (2006.01)
    *C08F 210/16*     (2006.01)
    *C08L 23/20*     (2006.01)

(52) U.S. Cl.
    CPC .......... *C08F 210/02* (2013.01); *C08F 210/08* (2013.01); *C08F 210/14* (2013.01); *C08L 23/16* (2013.01); *B01J 19/0053* (2013.01); *B01J 2219/182* (2013.01); *C08F 210/16* (2013.01); *C08L 23/20* (2013.01); *C08L 2314/02* (2013.01)

(58) Field of Classification Search
    USPC .................... 526/68, 905, 916; 422/134, 135
    See application file for complete search history.

(56) References Cited

U.S. PATENT DOCUMENTS

| | | | |
|---|---|---|---|
| 8,658,744 | B2 * | 2/2014 | van der Ham .......... C08F 10/00 528/502 F |
| 11,608,398 | B2 * | 3/2023 | Delsman ................. C08F 4/654 |
| 2013/0165613 | A1 | 6/2013 | Marzolla et al. |
| 2014/0332109 | A1 | 11/2014 | Cavalieri et al. |
| 2021/0355249 | A1 | 11/2021 | Delsman |

FOREIGN PATENT DOCUMENTS

| | | |
|---|---|---|
| EP | 3447088 A1 | 2/2019 |
| WO | 0220147 A1 | 3/2002 |
| WO | 2006002778 A1 | 1/2006 |
| WO | 2011155999 A1 | 12/2011 |
| WO | 2013083575 A1 | 6/2013 |
| WO | 2018059955 A1 | 4/2018 |

OTHER PUBLICATIONS

Written Opinion for International Application No. PCT/EP2019/070047, International Filing Date Jul. 25, 2019, Date of Mailing Oct. 1, 2019, 7 pages.

* cited by examiner

PROCESS FOR MAKING PROPYLENE-BASED TERPOLYMER

CROSS REFERENCE TO RELATED APPLICATIONS

This application is a National Stage application of PCT/EP2019/070047, filed Jul. 25, 2019, which claims the benefit of European Application No. 18186002.4, filed Jul. 27, 2018, both of which are incorporated by reference in their entirety herein.

TECHNICAL FIELD OF THE INVENTION

The invention relates to a process for production of terpolymers, in particular for the polymerization of propylene, and two other distinct monomers chosen from a group comprising ethylene and a C4-C12 α-olefin in a horizontal stirred reactor comprising an agitated bed for forming polymer particles.

STATE OF THE ART

The molecular weight of an olefin polymer, especially propylene polymers, typically is regulated by the use of hydrogen in the polymerization gas mixture. Generally speaking, a higher concentration of hydrogen will result in a lower molecular weight. The molecular weight distribution of the polymer composition, sometimes referred to as polydispersity, may affect polymer properties.

In horizontal stirred reactors, the average value of the distribution can be controlled by adjusting the inlet hydrogen flow rate to maintain a constant hydrogen to propylene ratio in the off-gas of the reactor. There is a direct link between the average chain length of the final polymer product and the gas phase hydrogen to propylene ratio.

WO2011/155999 describes a process for controlling $H_2$ distribution in a horizontal stirred bed reactor having more than one polymerization zones. In this process, the hydrogen concentration in the reaction zones are controlled by means of introducing quench liquids having different hydrogen concentrations to different reaction zones. $H_2$ is removed from part of the quench liquid. The $H_2$ lean quench liquid is added to the first reaction zone and the $H_2$ rich quench liquid is added to the subsequent reaction zone. By applying a hydrogen gradient along the horizontal stirred reactor, the molecular weight distribution is broadened.

Use of propylene/ethylene/1-hexene terpolymers is known in the art for the production of pipes. For example WO2006/002778 relates to a pipe system comprising a terpolymer of propylene/ethylene and alpha olefin wherein the ethylene content is from 0 to 9% by mol, preferably from 1 to 7% by mol and the 1-hexene content ranges from 0.2 to 5% wt. WO2013/083575 discloses a terpolymer containing propylene, ethylene and 1-hexene wherein: (i) the content of 1-hexene derived units ranges from 1 wt % to 3.2 wt %, (ii) the content of ethylene derived units is higher than 1.4 wt % and content of ethylene derived units <content of 1-hexene derived units −0.2, further defined by the MFR and the melting temperature. The terpolymers are made in two reactors in the processes of these documents.

The process of WO2011/155999 does not describe a process for polymerization of propylene, and two other distinct monomers chosen from a group comprising ethylene and a C4-C12 α-olefin, to which locations comonomers are to be fed, nor how the comonomer concentrations in the polymers produced in the reaction zones can be controlled.

SUMMARY OF THE INVENTION

It is an objective of the invention to provide a process for polymerization of propylene, and two other distinct monomers chosen from a group comprising ethylene and a C4-C12 α-olefin, in which the comonomer concentrations in the produced polymer inside the reaction zones can be controlled.

Accordingly, the invention provides a process for production of a propylene based terpolymer, comprising:
propylene,
a first distinct monomer chosen from a group comprising ethylene and C4-C12 α-olefin,
a second distinct monomer chosen from a group comprising ethylene and C4-C12 α-olefin
wherein
the first one of two distinct monomers and the second one of the two distinct monomers, are not the same monomer, and
the said process is performed in the presence of a catalyst system in a horizontal stirred reactor comprising:
an agitated bed for forming polymer particles,
a plurality of liquid feed ports that are subsequently arranged along a top side of the reactor above the agitated bed, the plurality of liquid feed ports comprising a first set of the liquid feed ports and a second set of the liquid feed ports arranged subsequent to the first set of the liquid feed ports in a downstream direction of the process, and
a plurality of gas feed ports that are subsequently arranged along a bottom side of the reactor below the agitated bed, the plurality of gas feed ports comprising a first set of gas feed ports and a second set of gas feed ports arranged subsequent to the first set of gas feed ports in the downstream direction of the process,
wherein the process comprises the steps of:
recovering a reactor off-gas comprising $H_2$, propylene, and said two distinct monomers from the reactor,
feeding the reactor off-gas to a condenser to form a gas-liquid mixture,
feeding the gas-liquid mixture to a separator to obtain a first gas stream and a first liquid stream:
the first gas stream comprising:
$H_2$,
propylene, and
the two distinct monomers, in an higher mole fraction than in the first liquid stream when they are lighter than propylene, and
the first liquid stream comprising:
$H_2$,
Propylene, and
the two distinct monomers, in an higher mole fraction than in the first gas stream when they are heavier than propylene,
wherein fresh propylene is further fed to the separator and/or added to the first liquid stream),
feeding the catalyst system to the reactor through a port arranged on the top side of the reactor,
feeding a $H_2$ poor quench liquid comprising propylene through the first set of the liquid feed ports, feeding a $H_2$ rich quench liquid comprising:
    $H_2$,
    Propylene, and
    the two distinct monomers,
to the reactor through the second set of liquid feed ports, wherein the $H_2$ rich quench liquid comprises at least part of the first liquid stream,
feeding a $H_2$ poor bottom gas comprising fresh propylene through the first set of gas feed ports,
feeding a $H_2$ rich bottom gas comprising:
    $H_2$,
    Propylene, and
    the two distinct monomers
through the second set of gas feed ports, wherein the $H_2$ rich bottom gas comprises at least part of the first gas stream, and
collecting the polymer particles formed in the agitated bed from the reactor, wherein the said process comprises the further following steps:
    at least one fresh of the two distinct monomers when it is lighter than propylene, is fed to:
        the reactor as
            a part of the $H_2$ poor bottom gas and/or
            as part of the $H_2$ rich bottom gas
        and/or fed to the separator
    at least one fresh of two distinct monomers when it is heavier than propylene, is fed:
        to the reactor as:
            a part of the $H_2$ poor quench liquid and/or
            a part of the $H_2$ rich quench liquid
        and/or to the separator.

It will be appreciated that the term "C4-C12 α-olefin" means an α-olefin having 4 to 12 carbon atoms. Preferably, in some embodiments, the C4-C12 α-olefin is selected from 1-butene, 1-hexene, 1-octene or mixtures thereof.

More preferably, in some embodiments, the first one of two other distinct monomers chosen from a group comprising ethylene, C4-C12 α-olefin is ethylene and the second one of two other distinct monomers chosen from a group comprising C4-C12 α-olefin, as define above.

In some embodiment, the second one of two other distinct monomers chosen from a group comprising ethylene, C4-C12 α-olefin is 1-hexene.

In some embodiments, a part of the first liquid stream is fed to a $H_2$ stripper (260, 360) to remove $H_2$ to form a second liquid stream comprising propylene and the two distinct monomers.

In some embodiments, at least part of the second liquid stream is fed to the reactor as a part of the $H_2$ poor quench liquid.

In some embodiments, at least part of the second liquid stream is vaporized and fed as a part of the $H_2$ poor bottom gas.

In some embodiments, the reactor off-gas is fed to a cyclone located between the reactor and the condenser, wherein polymer particles are carried back from the cyclone to the reactor by means of the $H_2$ poor gas stream.

In some embodiments, the catalyst system is a Ziegler-Natta catalyst system, wherein the Ziegler-Natta catalyst system comprises a procatalyst, a co-catalyst and optionally an external electron donor, wherein the procatalyst id obtained by a process comprising the steps of Step A) providing or preparing a compound $R^4_z MgX^4_{2-z}$ wherein
    $R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms;
    $X^4$ is independently selected from the group consisting of fluoride (F—), chloride (Cl—), bromide (Br—) or iodide (I—), preferably chloride;
    z is in a range of larger than 0 and smaller than 2, being 0<z<2;

Step B) contacting the compound $R^4_z MgX^4_{2-z}$ with a silane compound $Si(OR^5)_{4-n}(R^6)_n$ to give a first intermediate reaction product, being a solid $Mg(OR^1)_x X^1_{2-x}$ wherein
    $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
    $X^1$ is independently selected from the group consisting of fluoride (F—), chloride (Cl—), bromide (Br—) or iodide (I—), preferably chloride;
    n is in range of 0 to 4, preferably n is from 0 up to and including 1;
    z is in a range of larger than 0 and smaller than 2, being 0<z<2;
    x is in a range of larger than 0 and smaller than 2, being 0<x<2;

Step C) activating said solid support, comprising two sub steps:
    Step C1) a first activation step by contacting the first intermediate reaction product obtained in step B) with at least one first activating compound being a metal alkoxide compound of formula $M^1 (OR^2)_{v-w} (OR^3)_w$ or $M^2 (OR^2)_{v-w}(R^3)_w$; wherein: $M^1$ is a metal selected from the group consisting of Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; and a second activating compound being an activating electron donor; and
    Step C2) a second activation step by contacting the activated solid support obtained in step C1) with an activating electron donor; to obtain a second intermediate reaction product;

Step D) reacting the second intermediate reaction product obtained step C2) with a halogen-containing Ti-compound, optionally an activator prior to or simultaneous with the addition of an internal donor, and at least one internal electron donor to obtain said procatalyst.

In some embodiments, the reactor is provided with two reaction zones that are arranged subsequent to each other in the downstream direction of the process, wherein
    a first reaction zone of said two reaction zones is fed with the $H_2$ poor quench liquid and the $H_2$ poor bottom gas, and
    a second reaction zone of said two reaction zones is fed with the $H_2$ rich quench liquid and the $H_2$ rich bottom gas.

In some embodiments, the reactor is provided with three reaction zones that are arranged subsequent to each other in the downstream direction of the process, wherein
- a first reaction zone of said three reaction zones is fed with the $H_2$ poor quench liquid and the $H_2$ poor bottom gas,
- a second reaction zone of said three reaction zones is fed with either
  i) the $H_2$ poor quench liquid and the $H_2$ rich bottom gas, or
  ii) the $H_2$ rich quench liquid and the $H_2$ poor bottom gas, and
- a third reaction zone of said three reaction zones is fed with the $H_2$ rich quench liquid and the $H_2$ rich bottom gas.

Another aspect of the invention is a terpolymer composition obtained by or obtainable by the process according to the invention.

Another aspect of the invention is a setup assembly for the production of terpolymers comprising at least:

A horizontal stirred reactor comprising
- an agitated bed for forming polymer particles with at least two reaction zones,
- a plurality of liquid feed ports that are subsequently arranged along a top side of the reactor above the agitated bed, the plurality of liquid feed ports comprising
  - a first set of the liquid feed ports and
  - a second set of the liquid feed ports arranged subsequent to the first set of the liquid feed ports in a downstream direction of the process, and
- a plurality of gas feed ports that are subsequently arranged along a bottom side of the reactor below the agitated bed, the plurality of gas feed ports comprising
  - a first set of gas feed ports and
  - a second set of gas feed ports arranged subsequent to the first set of gas feed ports in the downstream direction of the process
- a plurality of off-gas ports arranged along a top side of the reactor above the agitated bed in a downstream direction of the process
- a recycle loop comprising
  - a condenser connected to the horizontal stirred reactor by the plurality of off-gas ports, and
  - a separator connected
    - to the condenser by a gas liquid mixture line and
    - to the horizontal stirred reactor by
      - a first liquid stream line to the second set of the liquid feed ports, and
      - a first gas stream line to the second set of gas feed ports.

In some embodiments, the setup assembly also comprise a stripper configured to remove at least $H_2$ and connected:
- to the separator through the first liquid stream line,
- to the first set of the liquid feed ports of horizontal stirred reactor through a second liquid stream line configured to carry on a $H_2$ poor quench liquid produce by the stripper, and
- to the condenser through a stream line.

In some embodiments, the setup assembly is configured to carry out the process according to the invention.

The invention further relates to a terpolymer composition obtained by or obtainable by the process of the invention.

PRESENTATION OF THE INVENTION

The invention is to provide a process for production of a propylene based terpolymer, comprising:
- propylene,
- a first distinct monomer chosen from a group comprising ethylene and C4-C12 α-olefin,
- a second distinct monomer chosen from a group comprising ethylene and C4-C12 α-olefin
- wherein
- the first one of two distinct monomers and the second one of the two distinct monomers are not the same monomer, and
- the said process is performed in the presence of a catalyst system in a horizontal stirred reactor comprising:
  - an agitated bed for forming polymer particles,
  - a plurality of liquid feed ports that are subsequently arranged along a top side of the reactor above the agitated bed, the plurality of liquid feed ports comprising a first set of the liquid feed ports and a second set of the liquid feed ports arranged subsequent to the first set of the liquid feed ports in a downstream direction of the process, and
  - a plurality of gas feed ports that are subsequently arranged along a bottom side of the reactor below the agitated bed, the plurality of gas feed ports comprising a first set of gas feed ports and a second set of gas feed ports arranged subsequent to the first set of gas feed ports in the downstream direction of the process,
- wherein the process comprises the steps of:
  - recovering a reactor off-gas comprising $H_2$, propylene, and said two distinct monomers from the reactor,
  - feeding the reactor off-gas to a condenser to form a gas-liquid mixture,
  - feeding the gas-liquid mixture to a separator to obtain a first gas stream and a first liquid stream:
    - the first gas stream comprising:
      - $H_2$,
      - propylene, and
      - the two distinct monomers in an higher mole fraction than in the first liquid stream when they are lighter than propylene and
    - the first liquid stream comprising:
      - $H_2$,
      - Propylene, and
      - the two distinct monomers in an higher mole fraction than in the first gas stream when they are heavier than propylene,
  - wherein fresh propylene is further fed to the separator and/or added to the first liquid stream),
  - feeding the catalyst system to the reactor through a port arranged on the top side of the reactor,
  - feeding a $H_2$ poor quench liquid comprising propylene through the first set of the liquid feed ports,
  - feeding a $H_2$ rich quench liquid comprising:
    - $H_2$,
    - Propylene, and
    - the two distinct monomers,
  - to the reactor through the second set of liquid feed ports, wherein the $H_2$ rich quench liquid comprises at least part of the first liquid stream
  - feeding a $H_2$ poor bottom gas comprising fresh propylene through the first set of gas feed ports, feeding a $H_2$ rich bottom gas comprising:
$H_2$,
Propylene, and
the two distinct monomers
through the second set of gas feed ports, wherein the $H_2$ rich bottom gas comprises at least part of the first gas stream, and
collecting the polymer particles formed in the agitated bed from the reactor, wherein the said process comprises the further following steps:
fresh at least one of the two distinct monomers when it is lighter than propylene is fed to:
the reactor as
a part of the $H_2$ poor bottom gas and/or
as part of the $H_2$ rich bottom gas
and/or fed to the separator
fresh at least one of two distinct monomers when it is heavier than propylene is fed:
to the reactor as:
a part of the $H_2$ poor quench liquid and/or
a part of the $H_2$ rich quench liquid
and/or to the separator.

In order to simplify the description of the invention and make it easily to understand, the first distinct monomer is the one with the lower molecular weight and the second distinct monomer is the one with the higher molecular weight. However, this statement is not a limitation of the invention, the opposite position is in the scope of this application and the man skilled in the art will easily adapted the teaching of this application in order to reproduce the invention.

According to the process of the invention, fresh first one of the two other distinct monomers chosen from a group comprising ethylene, C4-C12 α-olefin and fresh second one of the two other distinct monomers chosen from a group comprising ethylene, C4-C12 α-olefin may be fed to the reactor at different locations. Thus, the comonomer concentrations of two other distinct monomers chosen from a group comprising ethylene, C4-C12 α-olefin in the high molecular weight terpolymer made in the $H_2$ poor zones and the low molecular weight terpolymer made in the $H_2$ rich zones can advantageously be tuned according to desired needs requiring different properties.

The inventors have recognized that if the $H_2$-poor quench liquid fed to the first part of the reactor is made by stripping $H_2$ from the quench liquid fed to the later part of the reactor such as in the process of WO2011/155999, the stripping will also inevitably remove some part of the monomers.

In particular, the stripping process will remove a part of light molecular weight monomer, specially ethylene when it is used.

Consequently, the $H_2$-poor quench liquid will comprise a lower molecular weight monomer concentration than the $H_2$-rich quench liquid. This will create an uncontrolled gradient monomer concentration, in particular for light molecular weight monomer, in the reactor following the same trend with the $H_2$ concentration.

Instead of such uncontrolled gradient in comonomer concentrations, the present invention allows to provide a controlled gradient in comonomer concentrations by identifying how the comonomers should be fed to the reactor.

According to an embodiment of the invention process, a $H_2$ poor quench liquid, a $H_2$ rich quench liquid, a $H_2$ poor bottom gas and a $H_2$ rich bottom gas are fed to the reactor through respective feed ports.

A catalyst system is fed to the reactor through a port which may be one of the liquid feed ports for the quench liquid or a different port.

The polymer particles formed in the agitated bed are collected from the reactor and a reactor off-gas is recovered from the reactor, to be processed to form part of the feeds to the reactor.

For the avoidance of discussion, the liquid feed ports are arranged next to each other on the top side of the reactor in a direction parallel to an elongated center line of the reactor. Similarly, the gas feed ports are arranged next to each other on the bottom side of the reactor in a direction parallel to an elongated center line of the reactor.

Depending on a predefined configuration of the first set of liquid feed ports, the second set of liquid feed ports, the first set of gas feed ports and the second set of gas feed ports, the reactor may be provided with different reaction zones.

In some embodiments, the reactor is provided with two reaction zones that are arranged subsequent to each other in the downstream direction of the process, wherein
a first reaction zone of said two reaction zones which is fed with the $H_2$ poor quench liquid and the $H_2$ poor bottom gas, and
a second reaction zone of said two reaction zones which is fed with the $H_2$ rich quench liquid and the $H_2$ rich bottom gas.

In some embodiments, the reactor is provided with three reaction zones that are arranged subsequent to each other in the downstream direction of the process, wherein
a first reaction zone of said three reaction zones which is fed with the $H_2$ poor quench liquid and the $H_2$ poor bottom gas,
a second reaction zone of said three reaction zones which is fed with either i) the $H_2$ poor quench liquid and the $H_2$ rich bottom gas or ii) the $H_2$ rich quench liquid and the $H_2$ poor bottom gas, and
a third reaction zone of said three reaction zones which is fed with the $H_2$ rich quench liquid and the $H_2$ rich bottom gas.

In some embodiments, the reactor is provided with more than three reaction zones that are arranged subsequent to each other in the downstream direction of the process.

Independently of the number of reaction zones inside of the reactor, the reaction zones may have a similar volume or may have completely different volume. Depending of the configuration, the size of the reactor zones may influence of the molecular weigh distribution of the polymer obtain as in a larger zone, one or more monomer(s) or $H_2$ can be added in higher concentration than the other to obtain a particular profile.

In some embodiment, the reactor off-gas is fed to a condenser to be partly condensed and form a gas-liquid mixture.

The gas-liquid mixture is fed to a separator to obtain a first gas stream and a first liquid stream.

In some embodiment, fresh propylene may be fed to the separator and/or added to the first liquid stream. Fresh one of the two other distinct monomers may be fed to the separator and/or added to the first gas stream. Fresh other one of the two other distinct monomers may be fed to the separator and/or added to the first liquid stream.

In some embodiment, both distinct monomers can be fed together or separately to the separator and/or the first gas stream and/or the first liquid stream.

In some embodiments, at least part of the first gas stream is fed to the reactor as (part of) the $H_2$ rich bottom gas, typically after being mixed with additional $H_2$. In some embodiments, at least part of the first liquid stream is fed to the reactor as (part of) the $H_2$ rich quench liquid.

In some embodiments, part of the first liquid stream is fed to a $H_2$ stripper to remove $H_2$ (as a result of which some first one of two other distinct monomers chosen from a group comprising ethylene, C4-C12 α-olefin will also be removed, in particular ethylene when it is used) to form a second liquid stream comprising propylene and second one of the two other distinct monomers chosen from a group comprising ethylene, C4-C12 α-olefin (and some first one of the two other distinct monomers chosen from a group comprising ethylene, C4-C12 α-olefin which was not removed by the $H_2$ stripper).

The second liquid stream may be fed to the reactor as (part of) the $H_2$ poor quench liquid.

Alternatively or additionally, the second liquid stream may be fed as (part of) the $H_2$ poor bottom gas after being vaporized.

Fresh first one of the two other distinct monomers may be fed to the reactor by feeding the fresh first one of the two other distinct monomers directly to the reactor as a part of the $H_2$ poor bottom gas.

Alternatively or additionally, fresh second one of the two other distinct monomers may be fed to the separator. In the latter case, the $H_2$ rich bottom gas may comprise a portion of this monomer.

When all of the fresh first one of the two other distinct monomers are fed to the separator or added to the first gas stream, the upstream portion of the reactor receives only a small concentration of first one of two other distinct monomers.

Except for the first one of the two other distinct monomers received by back-mixing, the upstream portion of the reactor receives first one of the two other distinct monomers only when the second liquid stream (comprising some first one of two other distinct monomers) is made by a $H_2$ stripper and fed as part of the $H_2$ poor quench liquid. In this case, the concentration of first one of two other distinct monomers will increase sharply from the upstream portion to the downstream portion of the reactor. When all of the fresh first one of the two other distinct monomers are fed directly to the reactor as a part of the $H_2$ poor bottom gas, the downstream portion of the reactor receives first one of the two other distinct monomers only from the reactor off-gas. In this case, the first one of the two other distinct monomers concentration in the upstream portion with respect to that in the downstream portion will be higher than in the former case (where all of the fresh first one of two other distinct monomers are fed to the separator or added to the first gas stream), provided that the other process parameters are the same.

Typically, the concentration of first one of the two other distinct monomers will increase from the upstream portion to the downstream portion of the reactor (since the amount of first one of the two other distinct monomers in the reactor off-gas is typically higher than the fresh first one of the two other distinct monomers), but the increase will not be sharp.

Therefore, the effect of comonomer distribution in the reactor will lead to different amount of this comonomer incorporated in the high and low molecular weight parts of the polymer.

It is preferable that part of the fresh first one of two other distinct monomers is fed directly to the reactor as a part of the $H_2$ poor bottom gas, and part of the fresh first one of the two other distinct monomers is fed to the separator or added to the first gas stream.

Accordingly, it is advantageously possible to tune the gradient of the concentration of first one of two other distinct monomers over the reactor, and thus the comonomer concentrations in the terpolymers produced.

The tuning can be done by choosing the ratio between fresh first one of the two other distinct monomers fed as part of the $H_2$ poor bottom gas (directly fed to the upstream portion of the reactor) and fresh first one of the two other distinct monomers fed as part of the $H_2$ rich bottom gas (fed to the separator or added to the first gas stream).

When a larger amount of fresh first one of the two other distinct monomers is directly fed to upstream portion of the reactor, the amount of first one of the two other distinct monomers in the high molecular weight terpolymer produced in the $H_2$ poor zone will be higher.

Fresh second one of the two other distinct monomers may be fed to the reactor by feeding the fresh second one of the two other distinct monomers to the reactor as a part of the $H_2$ poor quench liquid. This can be done by feeding fresh second one of the two other distinct monomers directly to the reactor.

This can also be done by feeding fresh second one of the two other distinct monomers to either the $H_2$ stripper or the bottom liquid stream leaving the $H_2$ stripper (the second liquid stream) in embodiments where the $H_2$ stripper is used.

Alternatively or additionally, fresh second one of the two other distinct monomers may be fed to the separator or added to the first liquid stream. In these cases, the $H_2$ rich quench liquid comprises the fresh second one of the two other distinct monomers fed to the separator. Further, the fresh second one of the two other distinct monomers may be comprised in the $H_2$ poor quench liquid as part of the second liquid stream formed by the stripper from the first liquid stream.

When all of the fresh second one of the two other distinct monomers are fed to the reactor as part of the $H_2$ poor quench liquid, the downstream portion of the reactor receives second one of the two other distinct monomers only from the reactor off-gas. The concentration of the second one of the two other distinct monomers will then generally decrease from the upstream portion to the downstream portion of the reactor.

When all of the fresh second one of the two other distinct monomers is fed to the separator or added to the first liquid stream, the upstream portion of the reactor receives second one of the two other distinct monomers only as part of the second liquid stream made by stripping $H_2$ (and some first one of two other distinct monomers) from the first liquid stream. The concentration of the second one of the two other distinct monomers will generally increase from the upstream portion to the downstream portion of the reactor.

It is preferable that part of the fresh first one of two other distinct monomers fed to the reactor as a part of the $H_2$ poor quench liquid, and part of the fresh second one of the two other distinct monomers is fed to the separator or added to the first liquid stream.

Accordingly, it is advantageously possible to tune the gradient of the concentration of the second one of the two other distinct over the reaction zones of the reactor.

The tuning can be done by choosing the ratio between fresh second one of the two other distinct monomers fed to the reactor as part of the $H_2$ poor quench liquid and fresh second one of the two other distinct monomers fed to the separator or added to the first liquid stream.

Further, the concentration of the second one of the two other distinct monomers in the upstream portion of the reactor may be decreased (increased) by feeding more (less) amount of fresh propylene as part of the $H_2$ poor quench liquid with respect to the amount of fresh propylene fed as part of the $H_2$ rich quench liquid.

Thus, according to the process of the invention, the comonomer concentrations of the first one of two other distinct monomers and the second one of the two other distinct monomers in the low molecular weight terpolymer and the high molecular weight terpolymer can advantageously be tuned according to desired needs.

In some embodiment, the reactor off-gas is fed to a cyclone from which polymer particles are carried back to the reactor.

Depending of the position of reentry of the polymer particles inside the reactor, different stream will be used:
  A reentry inside the first reaction zone of the reactor will be by means of the $H_2$ poor gas stream;
  A reentry inside the last reaction zone of the reactor will be by means of the $H_2$ rich gas stream.

In the process of the invention, a catalyst system is added to the reactor for polymerizing propylene, and two other distinct monomers chosen from a group comprising ethylene and the C4-C12 α-olefin.

The catalyst system is typically added through the liquid feed ports.

The catalyst system may be a metallocene based catalyst system.

In a preferred but non-limiting embodiment, the catalyst system may be a Ziegler-Natta catalyst system.

In some embodiments, suitable catalyst system, such as a high activity Ziegler-Natta catalyst system comprising a solid, titanium-containing component in combination with at least one aluminum alkyl cocatalyst, and preferably an external donor, is used.

Examples of the suitable catalyst systems are described in WO2011/155999, on page 7, line 16 to page 10, line 6; and page 10, line 31 to page 13, line 14 incorporated herein by reference.

Further examples of the suitable catalyst systems are described in WO2018059955.

For example, Ziegler-Natta catalyst system comprises
  a procatalyst,
  a co-catalyst and
  optionally an external electron donor,
wherein the procatalyst id obtained by a process comprising the steps of:
  A. Step A) providing or preparing a compound $R^4_z MgX^4_{2-z}$ wherein
    $R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms;
    $X^4$ is independently selected from the group consisting of fluoride (F—), chloride (Cl—), bromide (Br—) or iodide (I—), preferably chloride;
    z is in a range of larger than 0 and smaller than 2, being $0<z<2$;
  B. Step B) contacting the compound $R^4_z MgX^4_{2-z}$ with a silane compound $Si(OR^5)_{4-n}(R^6)_n$ to give a first intermediate reaction product, being a solid $Mg(OR^1)_x X^1_{2-x}$ wherein
    $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
    $X^1$ is independently selected from the group consisting of fluoride (F—), chloride (Cl—), bromide (Br—) or iodide (I—), preferably chloride;
    n is in range of 0 to 4, preferably n is from 0 up to and including 1;
    z is in a range of larger than 0 and smaller than 2, being $0<z<2$;
    x is in a range of larger than 0 and smaller than 2, being $0<x<2$;
  C. Step C) activating said solid support, comprising two sub steps:
    Step C1) a first activation step by contacting the first intermediate reaction product obtained in step B) with at least one first activating compound being a metal alkoxide compound of formula $M^1 (OR^2)_{v-w}(OR^3)_w$ or $M^2 (OR^2)_{v-w}(R^3)_w$; wherein: $M^1$ is a metal selected from the group consisting of Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; and a second activating compound being an activating electron donor; and
    Step C2) a second activation step by contacting the activated solid support obtained in step C1) with an activating electron donor; to obtain a second intermediate reaction product;
  D. Step D) reacting the second intermediate reaction product obtained step C2) with a halogen-containing Ti-compound, optionally an activator prior to or simultaneous with the addition of an internal donor, and at least one internal electron donor to obtain said procatalyst.

The further preferred examples of the procatalyst are mentioned in the claims of WO2018059955, incorporated by reference.

Particularly preferred procatalyst is catalyst H used in Example 8 of WO2018059955.

These catalyst systems of WO2018059955 are phthalate-free. This has the advantage that undesired phthalates will not end up in the drinking water transported by a pipe made by the composition according to the invention. Therefore, preferably, the composition of the invention as well as any articles comprising such composition, such as the pipes of the invention, are essentially phthalate-free. For purposes of the invention, essentially phthalate-free is defined as the presence of less than 0.0001 wt % of phthalates based on the composition, preferably 0.00000 wt % of phthalates based on the composition.

Preferably, one or both (preferably both) of the first terpolymer fraction and the second terpolymer fraction are prepared using the Ziegler-Natta catalyst system according to the catalyst system of claim 12 of WO2018059955.

The amounts of $H_2$ fed to the reactor may be selected according to known criteria such that desired molecular weights of the respective fractions are obtained.

The amounts of two other distinct monomers chosen from a group comprising ethylene and the C4-C12 α-olefin with respect to the amount of propylene to be fed to the reactor may be selected such that desired amounts of two other distinct monomers chosen from a group comprising ethylene and the C4-C12 α-olefin in the respective polymer fractions are obtained.

Conditions for the polymerization, such as temperature and time, pressures of the monomers, avoidance of contamination of catalyst and the use of additives to molecular weights are known to the skilled person. The temperature should be selected to ensure reasonable copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Olefin copolymerization according to this invention is carried out at monomer pressures of about atmospheric or above. Generally, monomer pressures range from about 1.2 to about 40 bar (120 to 4000 kPa), more typically 18 to 26 bar.

The copolymerization time will generally range from about ½ to several hours in batch processes with corresponding average residence times in continuous processes.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

After polymerization, polymer powder is removed from the polymerization reactor by methods known to the art, and preferably transferred to a polymer finishing apparatus in which suitable additives are incorporated into the polymer, which is heated, typically by mechanical shear and added heat, in an extruder to above melt temperature, extruded through a die, and formed into discrete pellets. Before processed by the extruder, polymer powder may be contacted with air or water vapor to deactivate any remaining catalytic species.

To realize the process according to the invention the setup assembly comprising at least:
a horizontal stirred reactor
a recycle loop and
optionally comprise a stripper loop:
The horizontal stirred reactor comprises at least:
an agitated bed for forming polymer particles with at least two reaction zones or more,
a plurality of liquid feed ports that are subsequently arranged along a top side of the reactor above the agitated bed,
a plurality of gas feed ports that are subsequently arranged along a bottom side of the reactor below the agitated bed,
a plurality of off-gas ports (116) arranged along a top side of the reactor above the agitated bed in a downstream direction of the process.
a plurality of catalyst feed system ports arranged on the top side of the reactor.
Each plurality liquid feed and gas feed ports are subdivided in group and arranged subsequently to one group after another in order that each group can be in different reaction zones in a downstream direction of the process.

The recycle loop comprising at least:
a condenser connected to the horizontal stirred reactor by the plurality of off-gas ports, and
a separator connected to the condenser by a gas liquid mixture line and to the horizontal stirred reactor by
a liquid stream line to liquid feed ports, and
a gas stream line to gas feed ports.

Optionally, the setup assembly can also comprise a stripper loop, which include at least a stripper column configured to remove at least $H_2$ from a liquid stream. The stripper column is connected to the separator through the liquid stream line, and deliver to the liquid feed ports of horizontal stirred reactor, through a poor $H_2$ line, a $H_2$ poor quench liquid, and send to the condenser through a rich $H_2$ line, the removed $H_2$.

In another embodiment, a part of the poor $H_2$ line stream can be vaporize in order to be delivered to the gas feed ports as a part of the $H_2$ poor quench gas.

Due to the specification of this setup assembly and its capacity to send in a controlled manner, $H_2$ poor quench liquid, $H_2$ poor bottom gas, $H_2$ rich quench liquid and $H_2$ rich bottom gas with their own specific monomer concentrations, in different reaction zones; it allows the operator to create inside of the reactor, different concentration gradients of monomers and $H_2$ in the different reaction zones.

These gradients allow the production of different profile of terpolymer composition with various weight distribution and monomer incorporation.

In a general manner:
when the fresh monomer is add only to the $H_2$ poor quench liquid and/or $H_2$ poor bottom gas, the monomer concentration will be higher in the first reaction zone and will decrease in the reaction zones in a downstream direction of the process;
when the fresh monomer is add only to $H_2$ rich quench liquid and/or $H_2$ rich bottom gas only through the separator or a line exiting the separator, the monomer concentration will be lower in the first reaction zone and will increase in the reaction zones in a downstream direction of the process;
when the fresh monomer is add to $H_2$ poor quench liquid, $H_2$ poor bottom gas, $H_2$ rich quench liquid and $H_2$ rich bottom gas the monomer concentration will be flat through the entire horizontal stirred reactor.

When a stripper loop is implemented, the concentration of monomers added in the separator or a line exiting the separator, is generally smoother through the entire reactor, as a part of the poor quench liquid/gas will contain some of the monomer.

By tuning the efficiency of the stripper loop and the addition of fresh $H_2$, the operator can create a gradient of $H_2$ through the entire horizontal stirred reactor which allows to modify the molecular weight distribution of the produced terpolymer:
higher $H_2$ concentration in the first reaction zone will create low molecular weight terpolymer,
higher $H_2$ concentration in the reaction zone in a downstream direction of the process, will create higher molecular weight terpolymer.

Since the reactor product is a blend of both fraction, it will exhibit a broadened molecular weight distribution.

It is noted that the invention relates to all possible combinations of features described herein, preferred in particular are those combinations of features that are present in the claims. It will therefore be appreciated that all combinations of embodiments; features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous as it offers a simpler, more economical process for the preparation of the product/composition. Similarly, it is also to be understood that a description on a process comprising certain steps also discloses a process consisting of these steps. The process consisting of these steps may be advantageous as it offers a simpler, more economical process.

When values are mentioned for a lower limit and an upper limit for a parameter, ranges made by the combinations of the values of the lower limit and the values of the upper limit are also understood to be disclosed.

BRIEF DESCRIPTION OF THE FIGURES

The invention is now elucidated referring to the drawings in which.

EXAMPLES

Example 1

Figure 1:
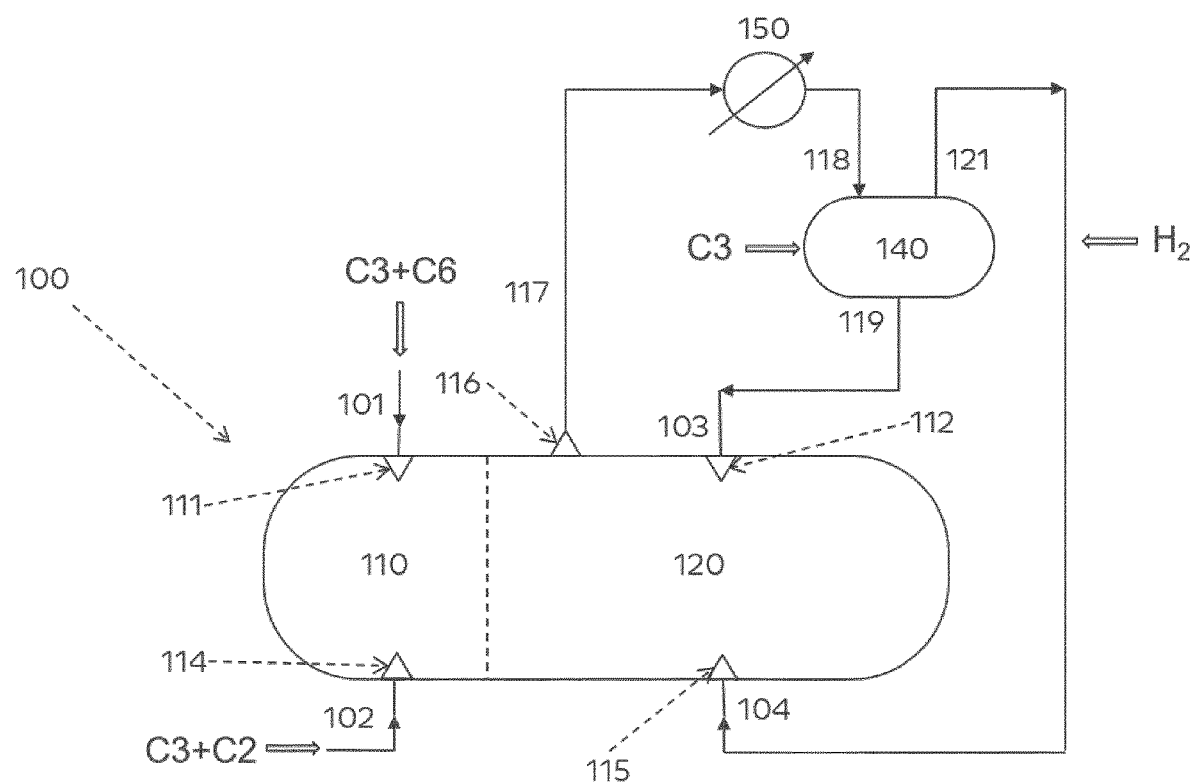
FIGS. 1 to 5 show a schematic representation of examples of a system for carrying out the process of the invention comprising a reactor with two reaction zones.

FIG. 1 shows a schematic representation of a non-limiting example of a system for carrying out the process of the invention, in which a reactor 100 consisting of a first reaction zone 110 and a second reaction zone 120.

In this embodiment, the two other distinct monomers chosen from a group comprising ethylene and C4-C12 α-olefin are ethylene and 1-hexene:
fresh 1-hexene is fed to the reactor by feeding the fresh 1-hexene directly to the reactor as a part of the $H_2$ poor quench liquid 101 and
fresh ethylene is fed to the reactor by feeding the fresh ethylene directly to the reactor as a part of the $H_2$ poor bottom gas 102.

The reactor off gas 117 is condensed by a condenser 150 to provide a gas-liquid mixture 118, whish fed a separator 140 where fresh propylene is added.

The separator 140 allows a separation of the gas-liquid mixture 118 into a first liquid stream 119 and a first gas stream 121.

The first gas stream 121 is mixed with additional $H_2$ and the obtained $H_2$ rich bottom gas 104 is fed to the second reaction zone 120.

Thus, in this embodiment, the first reaction zone 110 is fed with the $H_2$ poor quench liquid 101 and the $H_2$ poor bottom gas 102.

The terpolymer prepared in this first reaction zone 110 has a high molecular weight.

The second reaction zone 120 is fed with the $H_2$ rich quench liquid 103 and the $H_2$ rich bottom gas 104.

The terpolymer prepared in this second reaction zone 120 has a low molecular weight.

The 1-hexene concentration would be relatively higher in high molecular weight distribution part and ethylene concentration would be relatively flat over the reactor.

Example 2

Figure 2:
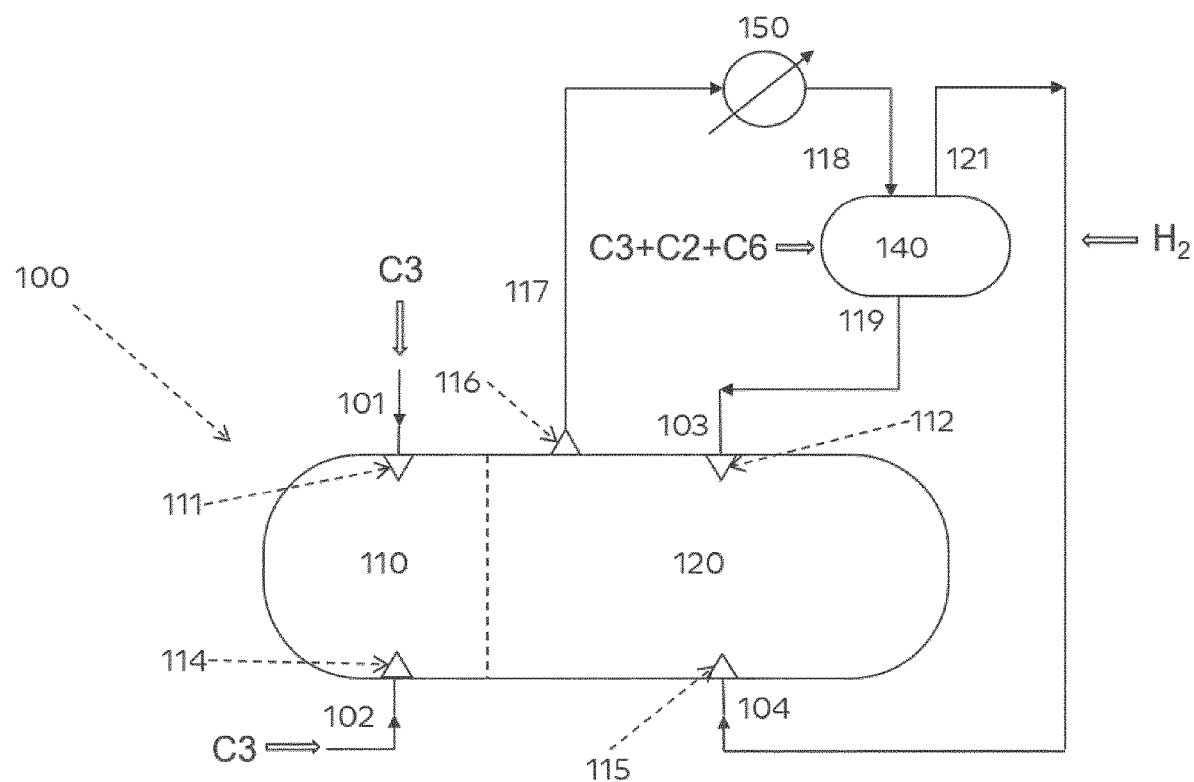

In another non-limitative embodiment shown by FIG. 2, fresh ethylene and 1-hexene could be add in the system through the separator 140.

In this configuration, 1-hexene and ethylene concentrations would be relatively higher in low molecular weight distribution part.

Example 3

Figure 3:
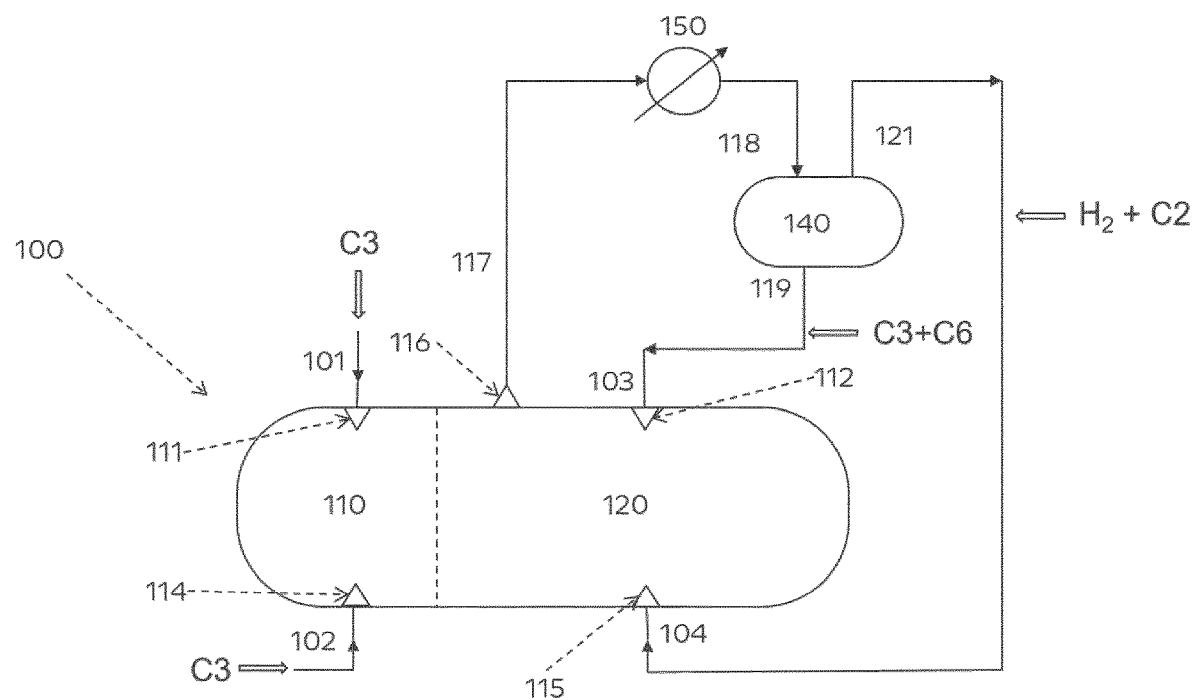

In another non-limitative embodiment shown by FIG. 3, fresh ethylene and 1-hexene could be add in the system after the separator 140:
the fresh 1-hexene and propylene may be added to the first liquid stream 119, as a part of the $H_2$ rich quench liquid 103.
the fresh ethylene may be added to the first gas stream 121, as a part of the $H_2$ rich bottom gas 104.

In this configuration, 1-hexene and ethylene concentrations would be relatively higher in low molecular weight distribution part.

Example 4

Figure 4:
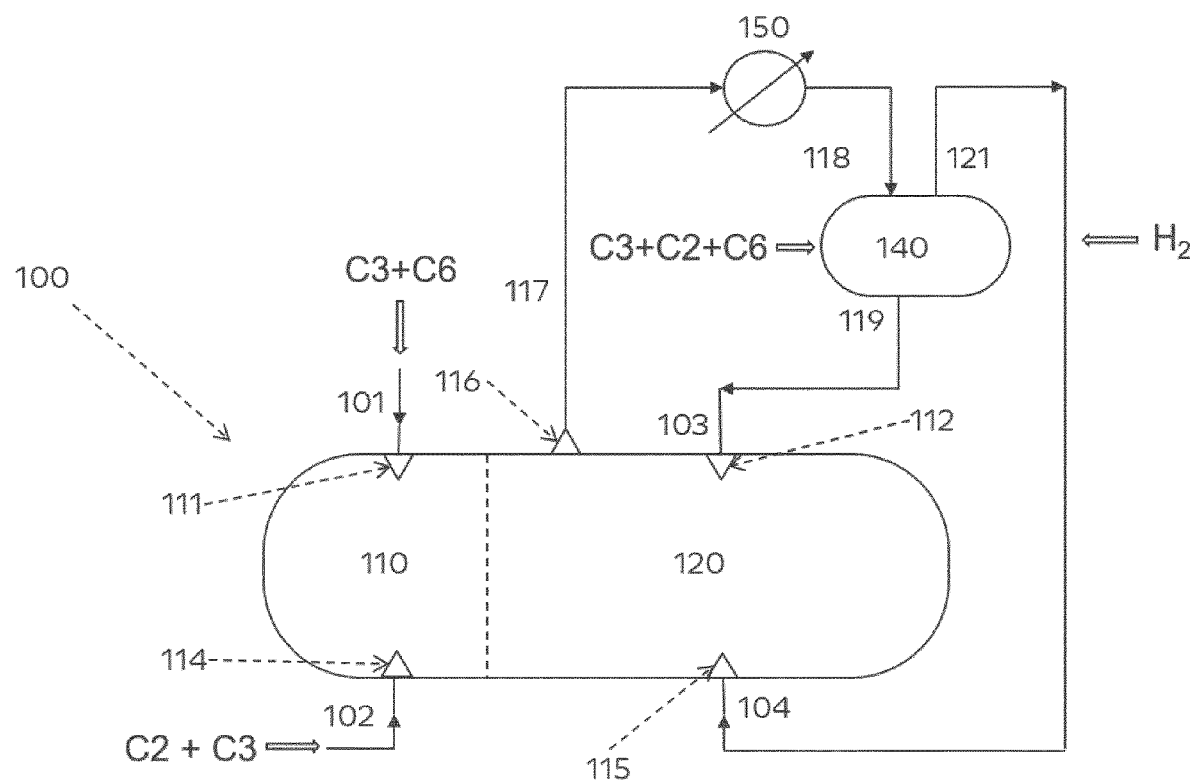

In another non-limitative embodiment shown by FIG. 4, which is the combination of the embodiments shown in FIGS. 1 and 2.

The split feed of the fresh 1-hexene and/or ethylene allows to give a flat profile of 1-hexene concentration in the weight distribution and an intermediate profile for ethylene than the one obtain in the embodiments described by FIGS. 1 and 2.

Example 5

Figure 5:
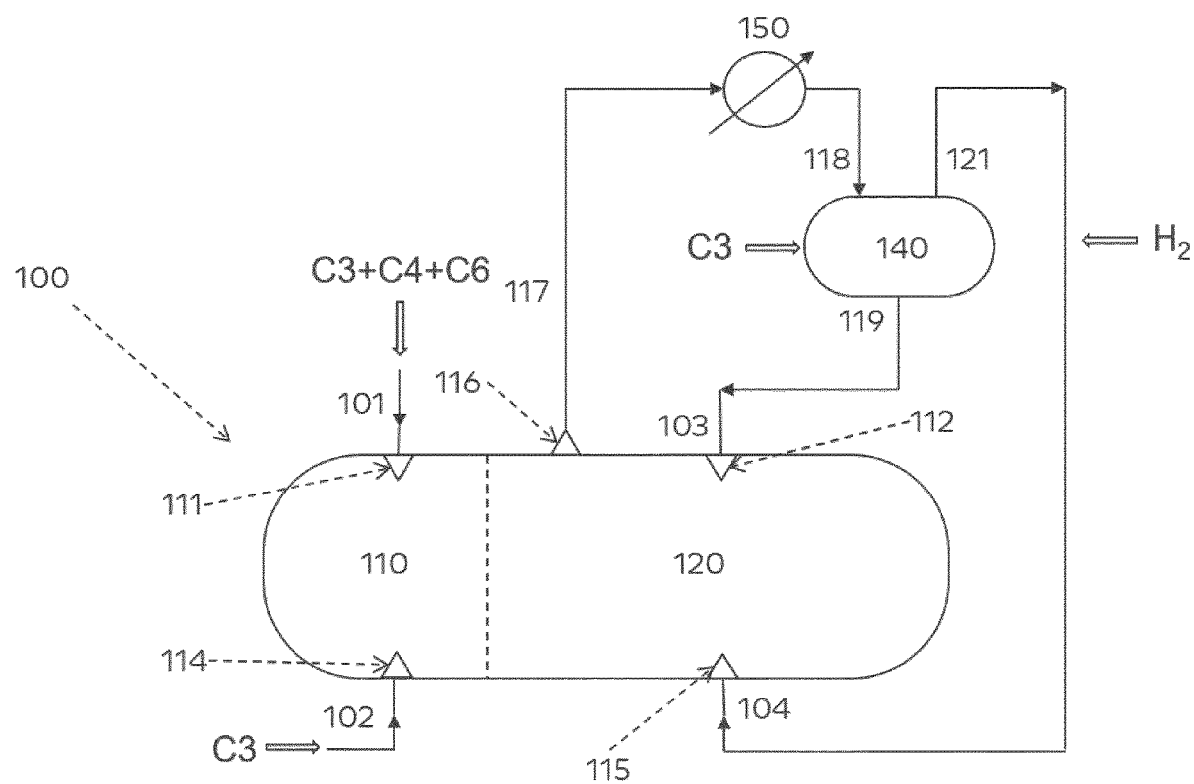

In another non-limitative embodiment shown by FIG. 5, a schematic representation of a non-limiting example of a system for carrying out the process of the invention, similar to the one describe in FIG. 1, in which the two other distinct monomers chosen from a group comprising ethylene and C4-C12 α-olefin are 1-butylene and 1-hexene:
fresh 1-butylene and 1-hexene and a part of the fresh propylene are fed to the reactor as a part of the $H_2$ poor quench liquid 101 and
a part of fresh propylene is fed to the reactor as a part of the $H_2$ poor bottom gas 102.

Example 6

Figure 6:
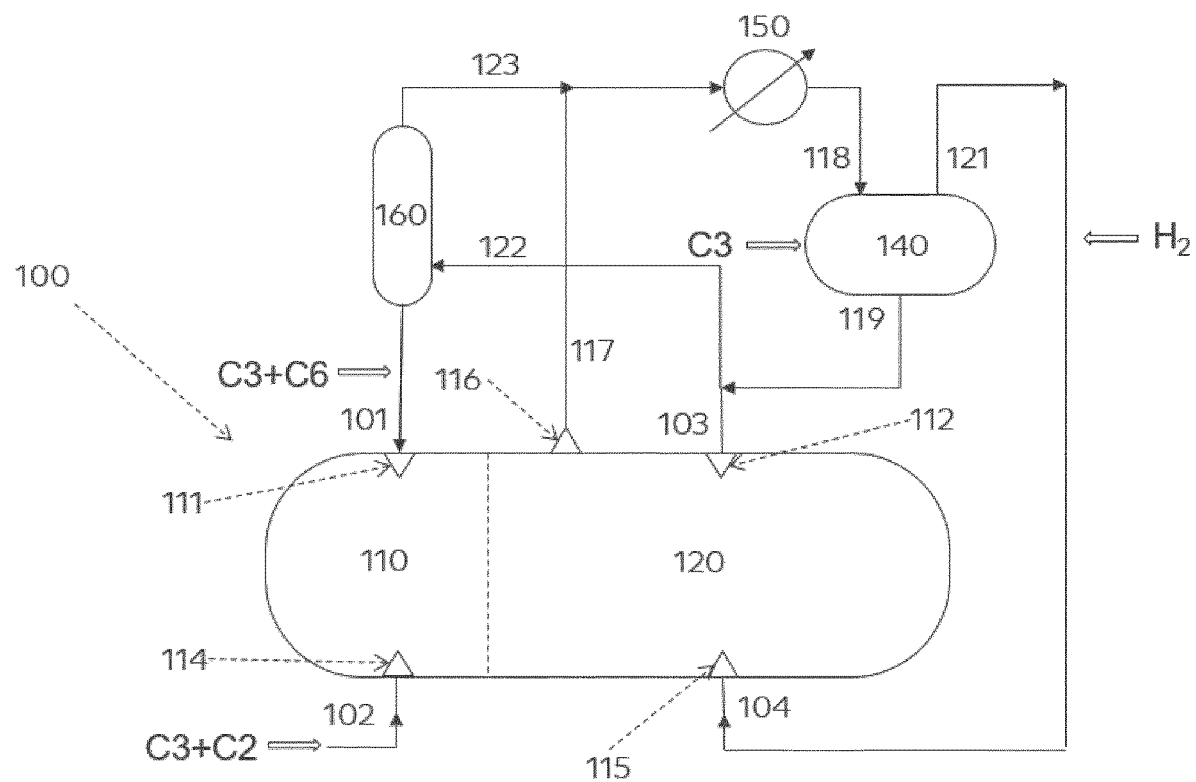
FIGS. 6 and 7 show a schematic representation of further examples of a system for carrying out the process of the invention comprising a reactor with two reaction zones and a stripper column.

In another non-limitative embodiment shown by FIG. 6, a schematic representation of a non-limiting example of a system for carrying out the process of the invention, similar to the one describe in FIG. 1 and comprising an additional stripper column 160 configured configured to remove at least $H_2$ and connected:

- to the separator 140 through a liquid stream line 122 comprising a part of the first liquid stream line 119,
- to the first set of the liquid feed ports 111 of horizontal stirred reactor 100 through a poor $H_2$ liquid stream line which is configured to carry on a $H_2$ poor quench liquid produce by the stripper, and
- to the condenser 150 through a rich $H_2$ stream line 123.

In this configuration, the stripper allows for high $H_2$ lean quench availability.

Example 7

Figure 7:
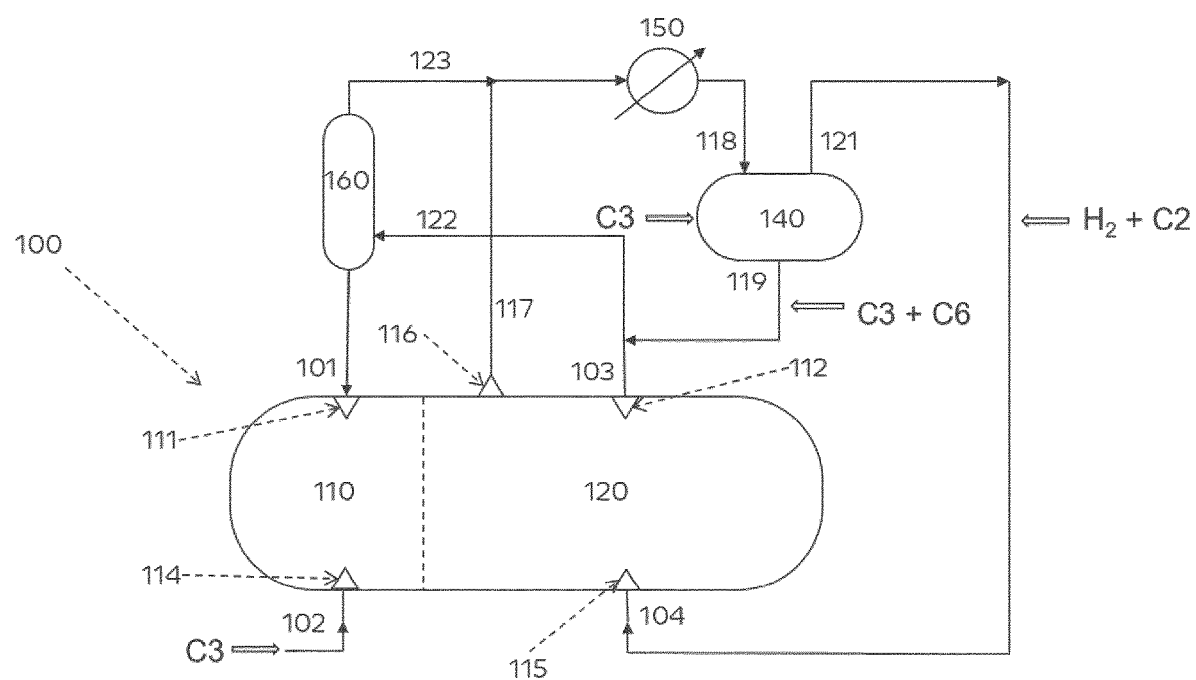

In another non-limitative embodiment shown by FIG. 7, a schematic representation of a non-limiting example of a system for carrying out the process of the invention, in which the two other distinct monomers chosen from a group comprising ethylene and C4-C12 α-olefin are ethylene and 1-hexene:

- fresh 1-hexene is fed to the reactor by adding the fresh 1-hexene to the first liquid stream 119 from the separator 140,
- a part 122 of the first liquid stream 119 is fed to a stripper 160 to remove $H_2$ and a part of ethylene to form a second liquid stream comprising in majority propylene and 1-hexene and
- the second liquid stream is fed to the reactor as a part of the $H_2$ poor quench liquid 101.

In this embodiment, the 1-hexene concentration and the ethylene concentration in the high molecular weight terpolymer (low $H_2$ concentration zone) would be lower than in the embodiment of FIG. 6, provided that other process parameters are the same.

Example 8

Figure 8:
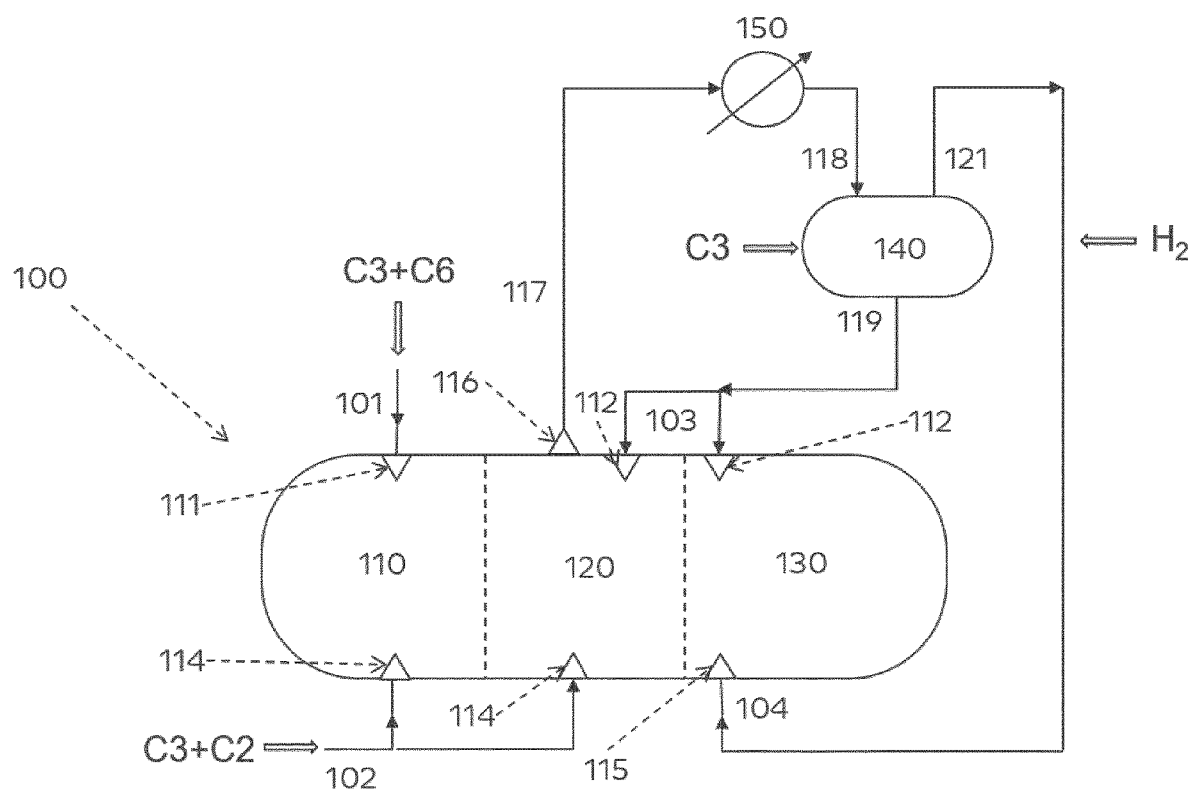
FIG. 8 shows a schematic representation of a further example of a system for carrying out the process of the invention comprising a reactor with three reaction zones.

In another non-limitative embodiment shown by FIG. 8, a schematic representation of a non-limiting example of a system for carrying out the process of the invention, in which the two other distinct monomers chosen from a group comprising ethylene and C4-C12 α-olefin are ethylene and 1-hexene:

- fresh 1-hexene is fed to the reactor by feeding the fresh 1-hexene directly to the reactor as a part of the $H_2$ poor quench liquid 101, and
- fresh ethylene is fed to the reactor by feeding the fresh ethylene directly to the reactor as a part of the $H_2$ poor bottom gas 102.

In this embodiment, the 1-hexene concentration and the ethylene concentration in the high molecular weight terpolymer (low $H_2$ concentration zone) are relatively high.

FIG. 8 shows a reactor 100 consisting of a first reaction zone 110, a second reaction zone 120 and a third reaction zone 130.

A $H_2$ poor quench liquid 101 comprising fresh propylene and fresh 1-hexene is fed to the first reaction zone 110 through a first set of liquid ports 111. Also a $H_2$ poor bottom gas 102 comprising fresh propylene and fresh ethylene is fed to the first reaction zone 110 through a first set of gas port 114.

A reactor off-gas 117 comprising $H_2$, ethylene, propylene and 1-hexene is recovered from the reactor through a set of off-gas ports 116.

The reactor off-gas 117 is condensed by a condenser 150 to provide a gas-liquid mixture 118, which is fed to a separator 140.

The separator 140 is also fed with fresh propylene.

The separator 140 provides a first liquid stream 119 comprising essentially propylene and 1-hexene as well as $H_2$ and ethylene dissolved in the liquid mixture of propylene and 1-hexene and a first gas stream 121 comprising essentially $H_2$, ethylene and propylene.

The first gas stream 121 is mixed with additional $H_2$ and the obtained $H_2$ rich bottom gas 104 is fed to the third reaction zone 130.

The first liquid stream 119 is fed to the second reaction zone 120 and the third reaction zone 130 through the second set of liquid port 112, as the $H_2$ rich quench liquids 103.

Thus, in this embodiment, the first reaction zone 110 is fed with the $H_2$ poor quench liquid 101 and the $H_2$ poor bottom gas 102. The terpolymer prepared in this first reaction zone 110 has a high molecular weight.

The third reaction zone 130 is fed with the $H_2$ rich quench liquid 103 and the $H_2$ rich bottom gas 104. The terpolymer prepared in this first reaction zone 110 has a low molecular weight.

The second reaction zone 120 is fed with the $H_2$ rich quench liquid 103 and the $H_2$ poor bottom gas 102. The terpolymer prepared in this second reaction zone 120 has a molecular weight between those made in the first and the third reaction zones 110, 130.

Since fresh ethylene is fed directly to the first reaction zone 110 and the second reaction zone 120 as part of the $H_2$ poor bottom gas 102, the third reaction zone 130 receives ethylene only from the reactor off-gas.

Since fresh 1-hexene is fed directly to the first reaction zone 110 as the $H_2$ poor quench liquid 101, the second and the third reaction zones 120 and 130 receive 1-hexene only from the reactor off-gas. The concentration of 1-hexene in the first reaction zone 110 will be relatively high.

Example 9

Figure 10:
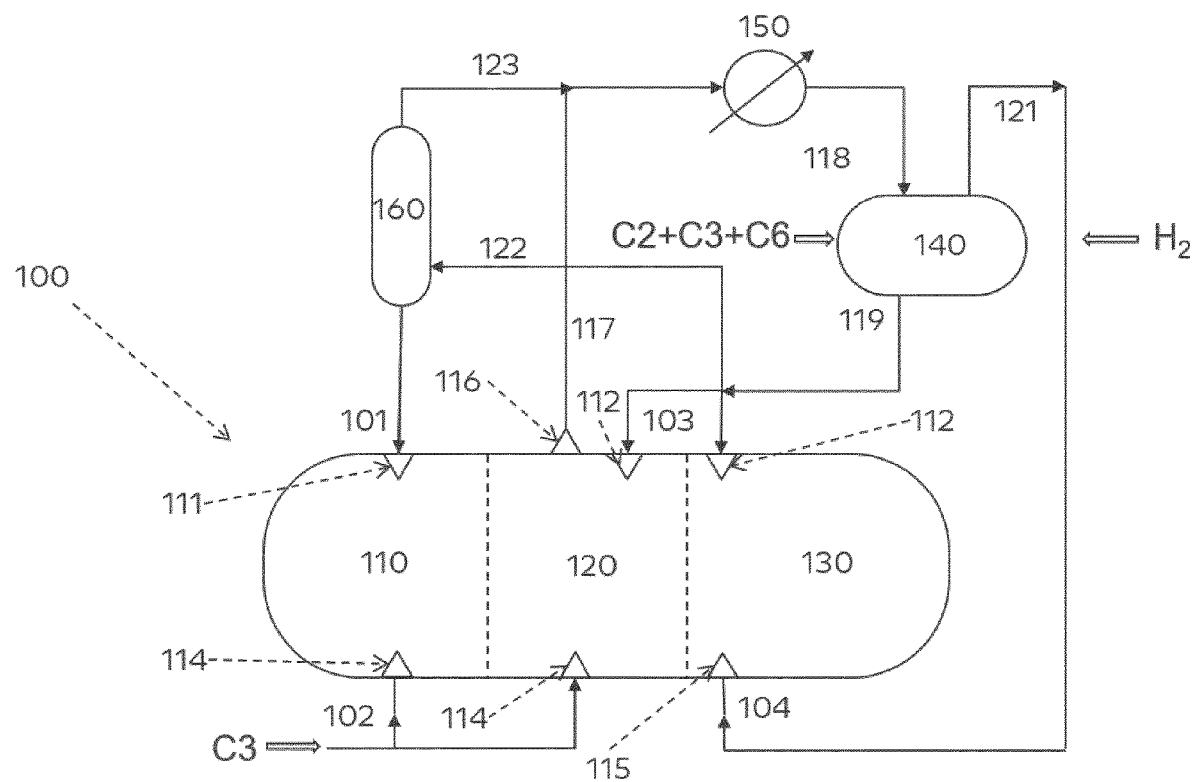

Similar to FIG. 8, FIG. 10 shows a reactor 100 consisting of a first reaction zone 110, a second reaction zone 120 and a third reaction zone 130.

In this embodiment, fresh propylene and ethylene are fed as part of the $H_2$ poor bottom gas 102 to the first reaction zone 110 and the second reaction zone 120. Fresh propylene, 1-hexene and ethylene are fed as part of the as a part of the $H_2$ poor quench liquid 101 to the first reaction zone 110.

The separator 140 provides a first liquid stream 119 and a first gas stream 121. The first gas stream 121 is mixed with additional $H_2$ and the obtained $H_2$ rich bottom gas 104 is fed to the third reaction zone 130.

The first liquid stream 119 is separated into a $H_2$ rich quench liquid 103 fed to the second reaction zone 120, and to the third reaction zone 130 and a part 122 of the first liquid stream 119 is fed to a $H_2$ stripper 160.

$H_2$ and some ethylene are removed from the part 122 of the first liquid stream 119 to form a second liquid stream 101 comprising propylene and 1-hexene and some ethylene which was not removed by the $H_2$ stripper.

The second liquid stream 101 is fed to the first reaction zone 110 as $H_2$ poor quench liquid.

Since fresh ethylene is fed directly to first and second reaction zone via the $H_2$ poor bottom gas 102, the third reaction zone 130 receives ethylene only from the reactor off-gas.

Since fresh 1-hexene is fed to the first reaction zone 110. The 1-hexene concentration would be high in the first reaction zone and lower in the other.

Example 10

In another non-limitative embodiment shown by FIG. 10, a schematic representation of a non-limiting example of a system for carrying out the process of the invention, in which the two other distinct monomers chosen from a group comprising ethylene and C4-C12 α-olefin are ethylene and 1-hexene:
  fresh ethylene and 1-hexene are fed to the reactor by feeding through the separator 140,
  a part 122 of the first liquid stream 119 is fed to a $H_2$ stripper 160 to remove $H_2$ and some ethylene to form a second liquid stream comprising propylene and 1-hexene and some ethylene which was not removed by the $H_2$ stripper and
  the second liquid stream is fed to the reactor as a part of the $H_2$ poor quench liquid 101.

Figure 9:
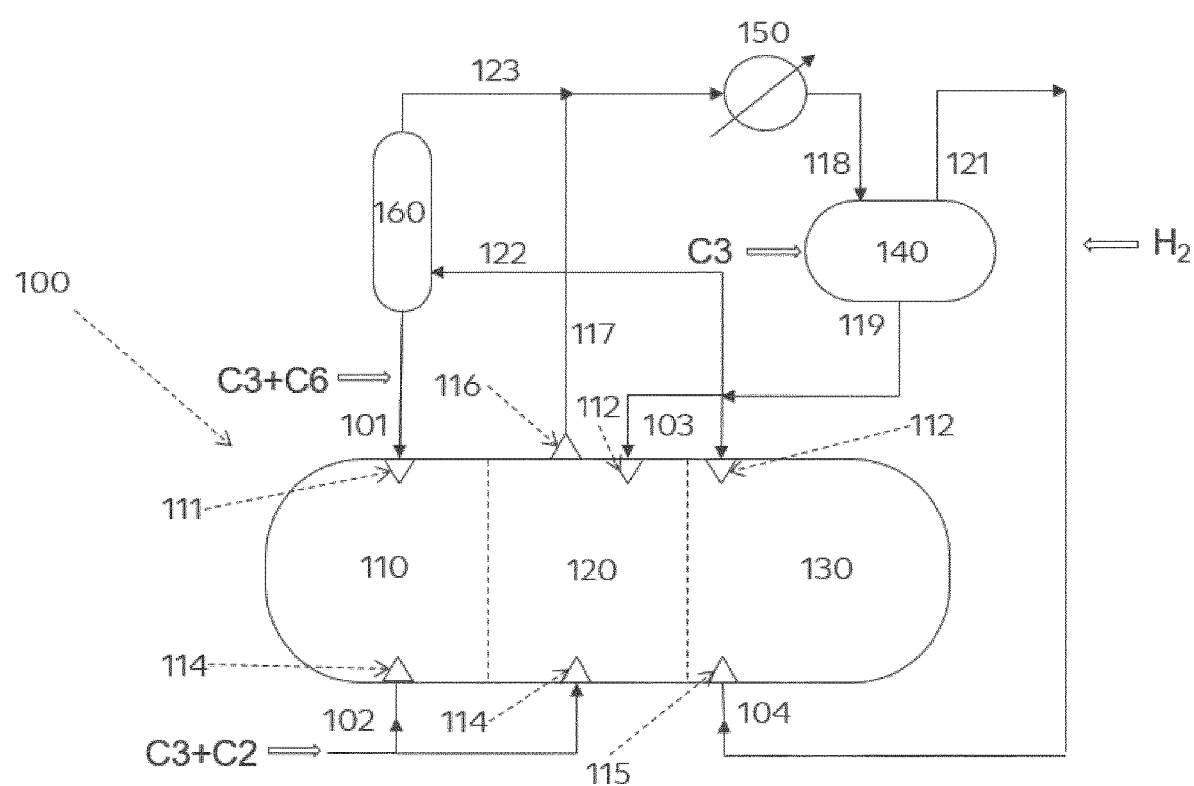
FIGS. 9, 10 and 11, show a schematic representation of further examples of a system for carrying out the process of the invention comprising a reactor with three reaction zones and a stripper column.

In this embodiment, the 1-hexene concentration and the ethylene concentration in the high molecular weight terpolymer (low $H_2$ concentration zone) would be generally lower than in the embodiment of FIG. 9, provided that other process parameters are the same.

Similar to FIGS. 8 and 9, FIG. 10 shows a reactor 100 consisting of a first reaction zone 110, a second reaction zone 120 and a third reaction zone 130.

In this embodiment, fresh propylene is fed as part of the $H_2$ poor bottom gas 102 to the first reaction zone 110 and the second reaction zone 120 through a first set of gas port 114.

Fresh propylene, 1-hexene and ethylene are fed to a separator 140.

The separator 140 provides a first liquid stream 119 and a first gas stream 121.

The first liquid stream 119 comprises essentially the fresh propylene and the fresh 1-hexene added to the separator.

The first gas stream 121 comprises essentially the fresh ethylene added to the separator. The first gas stream 121 is mixed with additional $H_2$ and the obtained $H_2$ rich bottom gas 104 is fed to the third reaction zone 130 through the second set of gas port 115.

The first liquid stream 119 is separated into a $H_2$ rich quench liquid 103 fed to the second reaction zone 120, and to the third reaction zone 130.

A part 122 of the first liquid stream 119 is fed to a $H_2$ stripper 160, where most part of $H_2$ and some ethylene are removed and fed to the condenser 150 through a rich $H_2$ line.

The stripper form a second liquid stream comprising essentially propylene and 1-hexene and some ethylene which was not removed by the $H_2$ stripper. The second liquid stream is fed to the first reaction zone 110 as a part of the $H_2$ poor quench liquid 101.

Since fresh ethylene is fed directly to the separator 140, the third reaction zone 130 receives ethylene via the $H_2$ rich bottom gas 104 and the concentration of ethylene in the third reaction 130 will be relatively high.

In contrast, the first and the second reaction zones 110, 120 receive ethylene only from the $H_2$ poor quench liquid 101 and the $H_2$ rich quench liquid 103, respectively. The concentration of ethylene in the second reaction zone 120 will be lower than in the third reaction zone 130 and the in the first reaction zone 110 will even lower than in the second reaction zone 120.

Since fresh 1-hexene is fed to the separator 140, the first reaction zone 110 receives 1-hexene only as part of the $H_2$ poor quench liquid 101. The 1-hexene concentration would be relatively flat over the reactor.

Example 11

Figure 11:
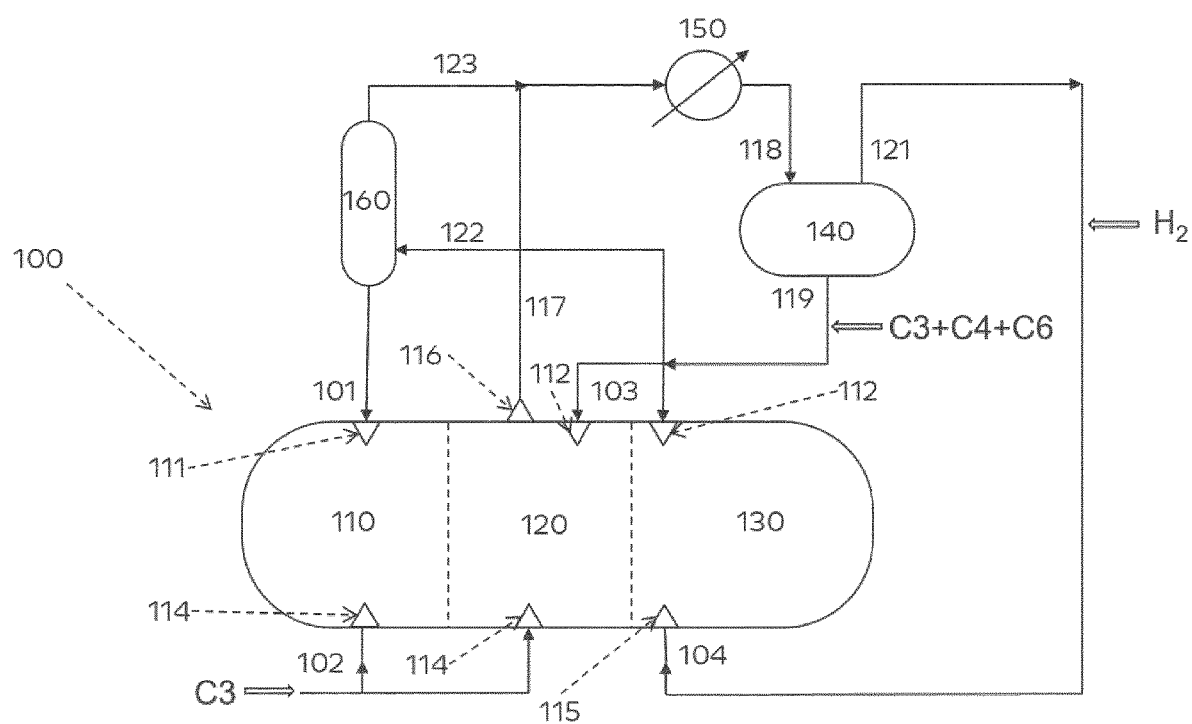

In another non-limitative embodiment shown by FIG. 11, a schematic representation of a non-limiting example of a system for carrying out the process of the invention, similar to the one describe in FIG. 9 or 10, in which the two other distinct monomers chosen from a group comprising ethylene and C4-C12 α-olefin are 1-butylene and 1-hexene:
  fresh 1-butylene and 1-hexene and a part of the fresh propylene are fed to the reactor through the first liquid stream 119 from the separator 140,
  a part of fresh propylene is fed to the reactor as a part of the $H_2$ poor bottom gas 102.

Example 12

Figure 12A:
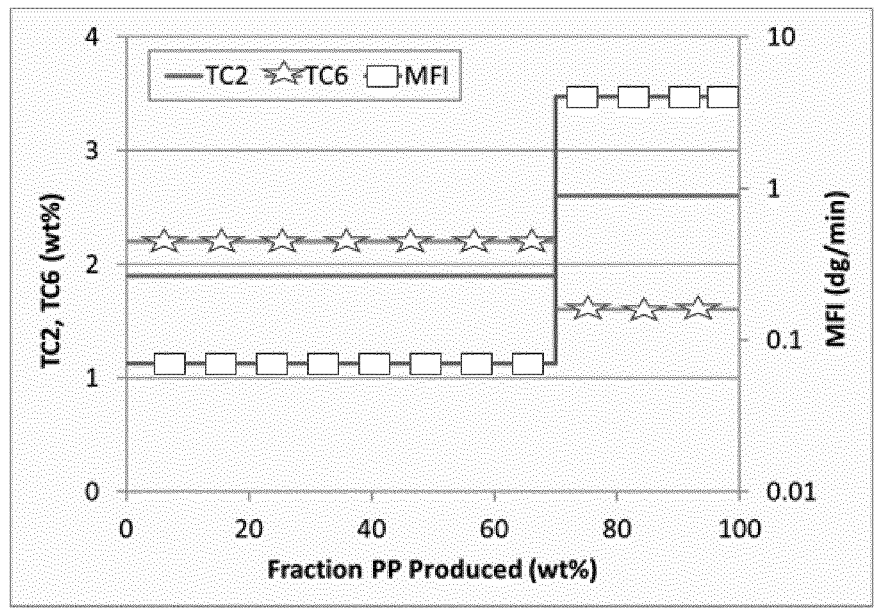
FIGS. 12a and 12b, show two graphs of the fraction PP produced in regard of the monomer and the melt flow index (MFI), 12a in a state of the art system to produce terpolymer comprising two separate reactor and 12b in a system according to the invention.
Figure 12B:
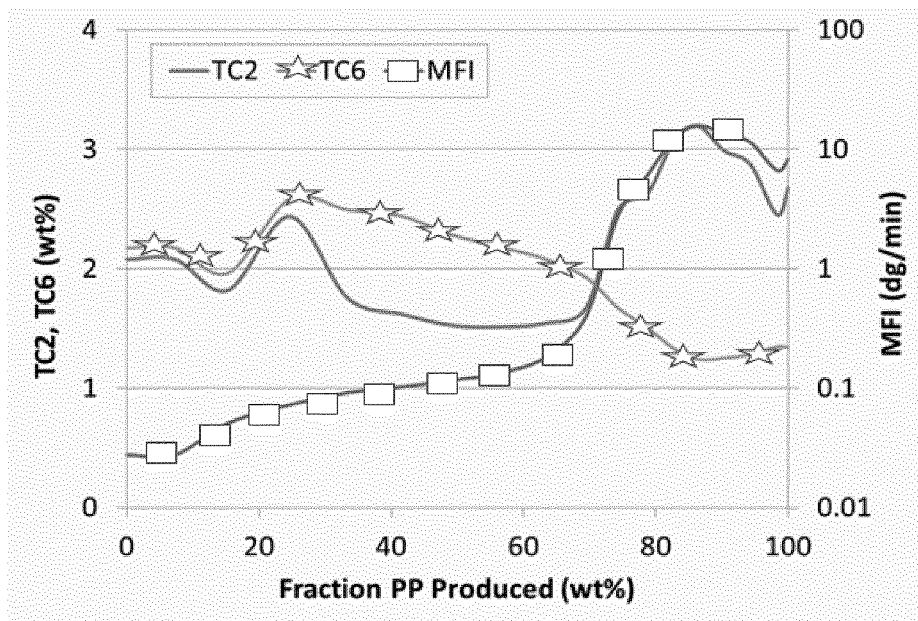

As show by the FIGS. 12a and 12b, the profile of the terpolymer obtain following a state of the art process comprising 2 separate reactors and a process according to the invention are very different.

In particular, in the state of the art system the profile is a step curve, while in the system of the invention the profile is more a damped curve.

Therefore, the process according to the invention allows the production of new kind of propylene-based terpolymer having properties suitable for new and old applications, that none of the processes described in the state of the art can produce.

LIST OF REFERENCE SIGNS 100 an horizontal stirred reactor
101 $H_2$ poor quench liquid
102 $H_2$ poor bottom gas
103 $H_2$ rich quench liquid
104 $H_2$ rich bottom gas
110 a first reaction zone
111 a first set of the liquid feed ports
112 second set of the liquid feed ports
114 a first set of gas feed ports
115 a second set of gas feed ports
116 off-gas ports
117 a reactor off-gas
118 a gas liquid mixture line
119 a first liquid stream line
120 a second reaction zone
121 a first gas stream
122 a part of the first liquid stream 119
123 a rich $H_2$ line
130 a third reaction zone
140 a separator
150 a condenser
160 a stripper column
116 off-gas ports

The invention claimed is:

1. A process for production of a propylene based terpolymer, comprising:
propylene,
a first distinct monomer which is ethylene or C4-C12 α-olefin,
a second distinct monomer which is ethylene or C4-C12 α-olefin,
wherein
the first distinct monomer and the second distinct monomer are not the same, and the said process is performed in the presence of a catalyst system in a horizontal stirred reactor (100) comprising:
an agitated bed for forming polymer particles,
a plurality of liquid feed ports (111, 112) that are subsequently arranged along a top side of the reactor above the agitated bed, the plurality of liquid feed ports comprising at least a first set of the liquid feed ports (111) and a second set of the liquid feed ports (112) arranged subsequent to the first set of the liquid feed ports in a downstream direction of the process, and
a plurality of gas feed ports (114, 115) that are subsequently arranged along a bottom side of the reactor below the agitated bed, the plurality of gas feed ports comprising at least a first set of gas feed ports (114) and a second set of gas feed ports (115) arranged subsequent to the first set of gas feed ports in the downstream direction of the process,
a plurality of reactor off-gas ports (116) that are arranged along a top side of the reactor above the agitated bed,
wherein the process comprises the steps of:
recovering a reactor off-gas (117) comprising $H_2$, propylene, and said first and second distinct monomers from the reactor through the reactor off-gas ports (116),
feeding the reactor off-gas (117) to a condenser (150) to form a gas-liquid mixture (118),
feeding the gas-liquid mixture (118) to a separator (140) to obtain a first gas stream (121) and a first liquid stream (119):
the first gas stream (121) comprising:
$H_2$,
propylene, and
one or both of the first and second distinct monomers, in an higher mole fraction than in the first liquid stream when they are lighter than propylene and
the first liquid stream (119) comprising:
$H_2$,
propylene, and
one or both of the first and second distinct monomers, in an higher mole fraction than in the first gas stream when they are heavier than propylene,
wherein fresh propylene is optionally further fed to the system, through the separator (140) and/or added to the first liquid stream (119),
feeding the catalyst system to the reactor through a port arranged on the top side of the reactor,
feeding a first quench liquid (101) comprising propylene through the first set of the liquid feed ports (111),
feeding a second quench liquid (103) comprising:
$H_2$ in a higher concentration than in the first quench liquid,
propylene, and
the first and second distinct monomers,
to the reactor through the second set of liquid feed ports (112), wherein second quench liquid (103) comprises at least part of the first liquid stream (119),
feeding a poor first bottom gas (102) comprising fresh propylene through the first set of gas feed ports (114),
feeding a second bottom gas (104) comprising:
$H_2$ in a higher concentration than in the first bottom gas,
propylene, and
the first and second distinct monomers
through the second set of gas feed ports (115), wherein the second bottom gas (104) comprises at least part of the first gas stream (121), and
collecting the polymer particles formed in the agitated bed from the reactor,
wherein the said process comprises the further following steps:
at least one fresh of the two distinct monomers when it is lighter than propylene, is fed to:
the reactor as
a part of the first bottom gas (102) and/or
as part of the second bottom gas (104)
and/or fed to the separator (140);
at least one fresh of two distinct monomers when it is heavier than propylene, is fed:
to the reactor as:
a part of the first quench liquid (101) and/or
a part of the second quench liquid (103)
and/or to the separator (140).

2. The process according to claim 1, wherein:
the said first distinct monomer is ethylene, and
the said second distinct monomer is C4-C12 α-olefin.

3. The process according to claim 1, wherein a part (122) of the first liquid stream (119) is fed to a $H_2$ stripper (160) to remove $H_2$ to form a second liquid stream comprising propylene and the first and second monomers.

4. The process according to claim 3, wherein at least part of the second liquid stream is fed to the reactor as a part of the first quench liquid (101).

5. The process according to claim 3, wherein at least part of the second liquid stream is vaporized and fed as a part of the first bottom gas (102).

6. The process according to claim 1, wherein the reactor off-gas is fed to a cyclone from which polymer particles are carried back to the reactor by means of the first gas stream (102).

7. The process according to claim 1, wherein said at least one of two distinct monomers is 1-hexene.

8. The process according to claim 1, wherein the catalyst system is a Ziegler-Natta catalyst system, wherein the Ziegler-Natta catalyst system comprises a procatalyst, a cocatalyst and optionally an external electron donor, wherein the procatalyst is obtained by a process comprising the steps of
Step A) providing or preparing a compound $R^4{}_z MgX^4{}_{2-z}$ wherein
$R^4$ is independently a linear, branched or cyclic hydrocarbyl group independently selected from the group consisting of alkyl, alkenyl, aryl, aralkyl, and alkylaryl groups, and one or more combinations thereof; wherein said hydrocarbyl group is substituted or unsubstituted, and optionally contain one or more heteroatoms;
$X^4$ is independently fluoride (F—), chloride (Cl—), bromide (Br—) or iodide (I—);
z is in a range of larger than 0 and smaller than 2, being $0<z<2$;

Step B) contacting the compound $R^4_z MgX^4_{2-z}$ with a silane compound $Si(OR^5)_{4-n}(R^6)_n$ to give a first intermediate reaction product, being a solid $Mg(OR^1)_x X^1_{2-x}$ wherein $R^1$, $R^5$ and $R^6$ are each independently a linear, branched or cyclic hydrocarbyl group which is an alkyl, alkenyl, aryl, aralkyl, alkoxycarbonyl or alkylaryl groups, or one or more combinations thereof; wherein said hydrocarbyl group is substituted or unsubstituted, and optionally contain one or more heteroatoms;

$X^1$ is independently fluoride (F—), chloride (Cl—), bromide (Br—) or iodide (I—);

n is in range of 0 to 4;

z is in a range of larger than 0 and smaller than 2, being $0<z<2$;

x is in a range of larger than 0 and smaller than 2, being $0<x<2$;

Step C) activating said first intermediate reaction product solid support, comprising two sub steps:

Step C1) a first activation step by contacting the first intermediate reaction product obtained in step B) with at least one first activating compound being a metal alkoxide compound of formula $M^1(OR^2)_{v-w}(OR^3)_w$ or $M^2(OR^2)_{v-w}(R^3)_w$; wherein: $M^1$ is a metal being Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from the group consisting of alkyl, alkenyl, aryl, aralkyl, alkoxycarbonyl, and alkylaryl groups, and one or more combinations thereof; wherein said hydrocarbyl group is substituted or unsubstituted, and optionally contain one or more heteroatoms; and a second activating compound being an activating electron donor; and Step C2) a second activation step by contacting the activated solid support obtained in step C1) with an activating electron donor; to obtain a second intermediate reaction product;

Step D) reacting the second intermediate reaction product obtained step C2) with a halogen-containing Ti-compound, optionally an activator prior to or simultaneous with the addition of an internal donor, and at least one internal electron donor to obtain said procatalyst.

9. The process according to claim 1, wherein the reactor is provided with two reaction zones that are arranged subsequent to each other in the downstream direction of the process, wherein a first reaction zone (110) of said two reaction zones is fed with the first quench liquid (101) and the first bottom gas (102), and a second reaction zone (120) of said two reaction zones is fed with the second quench liquid (103) and the second bottom gas (104).

10. The process according to claim 1, wherein the reactor is provided with three reaction zones that are arranged subsequent to each other in the downstream direction of the process, wherein a first reaction zone (110) of said three reaction zones is fed with the first quench liquid (101) and the first bottom gas (102), a second reaction zone (120) of said three reaction zones is fed with either i) the first quench liquid (101) and the second bottom gas (104) or ii) the second quench liquid (103) and the first bottom gas (102), and a third reaction zone (130) of said three reaction zones is fed with the second quench liquid (103) and the second bottom gas (104).

* * * * *